United States Patent [19]

Aumann et al.

[11] 4,043,100
[45] Aug. 23, 1977

[54] CUTTING MACHINE

[76] Inventors: Richard F. Aumann, 1390 Gulf Blvd.; Robert J. Aumann, 223 Dolphin Point, both of Clearwater, Fla. 33515

[21] Appl. No.: 625,690

[22] Filed: Oct. 24, 1975

[51] Int. Cl.² .................................................. A01D 55/262
[52] U.S. Cl. ........................................ 56/16.5; 56/13.1; 56/246
[58] Field of Search ................... 56/16.5, 12.8, 17.6, 56/24.6, 13.1

[56] References Cited

U.S. PATENT DOCUMENTS

| | | | |
|---|---|---|---|
| 2,351,460 | 6/1944 | Shelton | 56/17.6 |
| 3,134,213 | 5/1964 | Goetz | 56/17.6 |
| 3,254,481 | 6/1966 | Tweedale | 56/12.9 |
| 3,708,968 | 1/1973 | Enters et al. | 56/16.5 |

*Primary Examiner*—Russell R. Kinsey
*Attorney, Agent, or Firm*—Stefan M. Stein; Robert F. Frijouf

[57] ABSTRACT

A cutting machine including a mobile housing having mounted thereon a cutting blade driven by a prime mover in the form of a motor or the like which also drives a source of fluid flow disposed in communicating relation with the cutting area defined by the operative positioning of the cutting blade such that the debris from the cut grass is forced into a collection container or the like which is disposable and removably mounted from the housing. The cutting blade is interconnected to a drive shaft by a cam element engaging the cutting blade in such a manner as to move it in an eccentric fashion relative to the longitudinal axis of the drive shaft but in a non-rotational direction relative thereto.

13 Claims, 5 Drawing Figures

U.S. Patent Aug 23, 1977 4,043,100
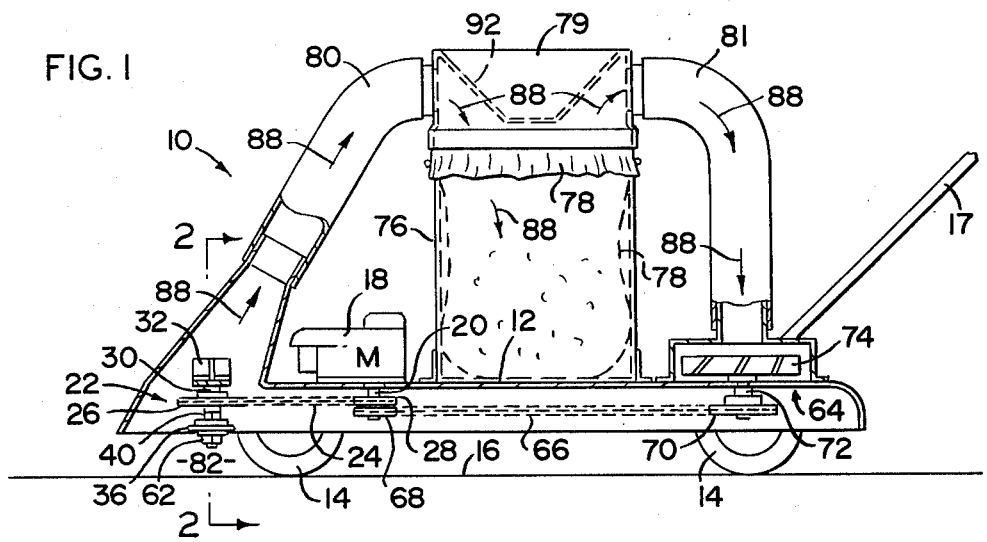
FIG. 1
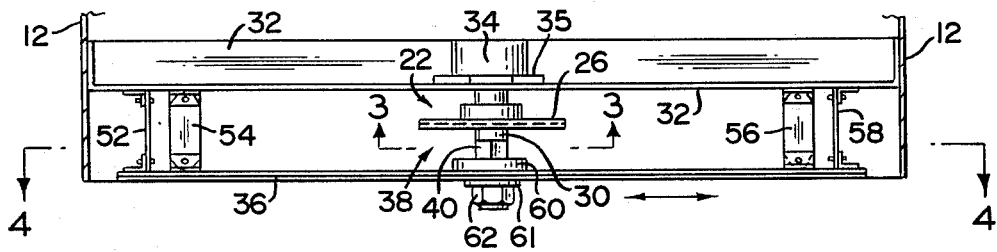
FIG. 2
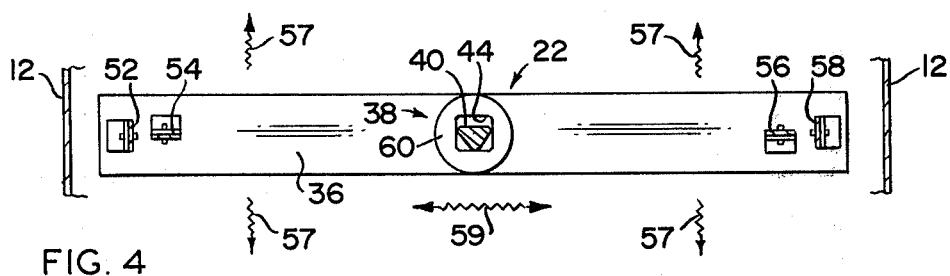
FIG. 3
FIG. 4
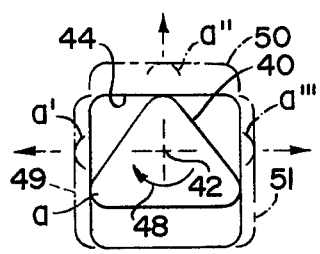
FIG. 5

CUTTING MACHINE

BACKGROUND OF THE INVENTION

1. Field of the Invention

This invention relates to a cutting machine used to cut grass and like substances by means of mounting a cutting blade on a mobile platform which may be manually propelled or self-driven wherein a debris collection system in the form of an established fluid flow path serves to collect the debris cut from the cutting blade.

2. Description of the Prior Art

Various types of agricultural cutting machines, more commonly known as lawn mowers are in common existence today and have been widely used for many years. The design and structural features of these prior art cutting machines vary extensively dependent upon the particular application and operation for which the machine was designed.

Commonly, such machines first developed from a manually powered push-type lawn mower wherein a "cage" like blade rotated around a substantially horizontally disposed axis of rotation. The blade was driven through proper gearing arrangements and was powered by the drive wheels of the push mower as they were forced to rotate by the operator moving the mower along the ground. While such a cutting machine was found to be generally operable, it was soon realized that great exertion must be utilized to operate such a machine, especially when attempting to cut thick or overgrown lawns, etc.

With the advent of self-powered machines or the utilization of a power source such as an electric or gasoline operated motor, lawn mowers or like cutting machines added an entirely different dimension in terms of performance and capabilities. The machines themselves have become more sophisticated in terms of accessories mounted on a mobile base which is propelled, again either manually or by operation of an independent prime mover or motor source.

While certain cutting machines incorporate a tractor type arrangement wherein the operator sits on the entire mobile platform and physically drives the cutting machine vehicle, other machines utilize an auxiliary motor source merely to rotate the blade. Irrespective of which type general cutting machine is utilized, the design of such machines while still incorporating a variety of forms have become much more highly efficient.

Irrespective of the improved operating characteristics there is still a need in the industry for a reliable, efficient cutting machine with meaningful operating characteristics capable of reliable working operation through all types of grass or other type plants being cut.

The collecting of debris, clippings and cuttings associated with the cutting of grass has also been a long recognized problem in the lawn and grass care industry. A plurality of collecting devices exists in the prior art and are presently commercially available in combination with modern day lawn mower machines. The vast majority of these however are directed to a "blowing" of the debris and clippings initially collected in the cutting area of the cutting machine out through the cutting deck or housing into some type of collecting container or the like.

Accordingly, it can be seen that there is a need in the industry for an effective mower having adequate collecting facilities capable of efficiently transfering debris, clippings, etc., from the cutting area of the cutting machine to a storage area wherein preferably the collected debris may be disposed of through adequate containers mounted directly on the cutting machine itself. In addition, the cutting assembly of such a machine should be uncomplicated and contain a minimum of moving parts so as to eliminate the need for maintainance and also reduce the initial cost during production.

SUMMARY OF THE INVENTION

This invention relates to a cutting machine having a housing or casing which is mobile and may be propelled either manually or by being self-driven through proper motor means. A prime mover means in the form of a gasoline or electric activated motor is mounted on the housing and drivingly connected through proper linkage to a cutting blade means. More specifically, the cutting blade is mounted on a drive shaft which in turn is mounted to rotate about its own longitudinal axis through driving interconnection with prime mover.

A debris collection assembly is also mounted on the casing and includes an impeller also drivingly rotated by interconnection with the prime mover means. The propeller is disposed in fluid communication both with the cutting area and a collection means. The collection means includes a disposable container element movably mounted on the housing for free removal therefrom upon being filled. More specifically, the disposable container may be in the form of a relatively conventional type plastic or otherwise disposable material bag mounted within a specific housing which again is established in fluid communication with both the impeller and the cutting blade.

As set forth above, the prime mover means is drivingly interconnected with both the impeller and the drive shaft attached to the blade through proper linkage and gearing assemblies. Accordingly, the cutting blade may be operated concurrently with driving the impeller so that the debris may be simultaneously removed from the cutting area upon being cut.

An important structural feature of the present invention comprises the cutting blade moving in its operative, cutting fashion but in non-rotating direction relative to the longitudinal axis of the drive shaft.

This eccentric cutting action of the cutting blade occurs by means of being attached to the drive shaft through interconnection means. The interconnection means is in the form of a cam fixedly attached to rotate with the drive shaft about the longitudinal axis of the drive shaft. The cam means has a predetermined configuration and is slidingly mounted within an aperture formed in the substantial center of the cutting blade. The aperture is also formed in to a predetermined configuration which cooperatively reacts with the outer periphery and the external configuration of the cam element. This interaction creates an eccentric movement of the cutting blade in a non-rotational manner relative to the longitudinal axis of the drive shaft.

Bias means in the form of a one or more spring elements are interconnected between a supporting frame or portion of the housing and the cutting blade itself. The spring element serves to "restrict" the forced movement of the cutting blade and thereby define its path of travel in the eccentric fashion set forth above. Placement of the spring element is such as to normally bias the blade back into its non-operative position wherein rotation of the drive shaft and the cam thereon moves the cutting blade against the forces exerted on the blade by the spring elements. This action aids in the eccentric movement of the cutting blade and helps define the cutting action of the blade against the grass or other substance being cut.

This invention accordingly comprises an apparatus possessing the features, properties and the relation of elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 1 is a side elevational view with portions broken away and shown in section showing interior portions of the housing and the relative disposition of the various elements comprising the cutting machine of the present invention.

FIG. 2 is a sectional view of the cutting blade means taken along line 2—2 of FIG. 1.

FIG. 3 is a sectional view of the interconnecting means taken along line 3—3 of FIG. 2.

FIG. 4 is a top view and partial section of the cutting blade and biasing means attached thereto.

FIG. 5 is an enlarged detailed view showing the various positions, in broken lines, of the interconnecting means relative to the portion of the cutting blade which it engages.

Similar reference characters refer to similar parts throughout the several views of the drawings.

DETAILED DESCRIPTION

As shown in FIG. 1, the subject invention is directed to a cutting machine generally indicated as 10 and comprising a mobile housing 12 mounted on wheel means 14 or other devices allowing the housing 12 to move over the surface 16. A handle means 17 is attached to the housing 12 so as to guide and/or propel the housing relative to surface 16. While the present invention is described with reference to a push type mower, it should be noted that the structure of the present invention can be incorporated in either a manually propelled or a self-actuated travel mower having any of a variety of designs and configurations.

A prime mover means 18 may comprise a gasoline or other conventionally powered motor. The motor or prime mover is fixedly attaced to the housing 12 and serves to rotate shaft 20. The cutting assembly, generally indicated as 22 is drivingly connected with the motor 18. More specifically, a drive assembly in the form of a drive chain 24 and sprocket gears 26 and 28 serve to drivingly interconnect the prime mover 18 with the cutting assembly 22. The drive shaft 30 in turn is mounted on support frame 32 so as to rotate about its own longitudinal axis. Proper bushing means 34 and nut elements 35 may be interconnected to the drive shaft 30 and the support frame 32 so as to properly mount the shaft 30 thereon and allow its rotational movement as set forth above. The cutting blade means 36 is mounted on drive shaft 30 by interconnection means generally indicated as 38. (FIG. 3). In the particular embodiment shown, the cutting blade 36 has an elongated somewhat bar-like configuration. However, the specific configuration of the cutting blade 36 may take a variety of configurations and still be maintained within the scope of the present invention.

The interconnecting means comprises a cam element 40 shown in FIGS. 2, 3 and 4 and in detail in FIG. 5. The cam element 40 is fixedly attached to the drive shaft 30 in off-set relation thereto. With reference to FIG. 5, numeral 42 indicates the approximate point of interconnection of the drive shaft, relative to its longitudinal axis, and the cam member 40. An aperture means 44 is formed in the approximate center of the blade means 36 and is configured to cooperatively engage the outer periphery of the cam element 40.

By virtue of the off-set engagement between drive shaft 30 and cam element 40 rotation of the drive shaft causes an eccentric movement of the cam element 40 in the manner to be described with reference to FIG. 5. More specifically, point $a$ represents one point or extremity of the cam element. As the cam element rotates in the direction indicated by arrow 48, point $a$ moves to the position indicated by $a'$ in broken lines, (FIG. 5). This causes a resulting movement of the aperture and the integrally formed surrounding blade 36 to the position indicated in broken lines as 49. Continued rotation of point $a$ to the position $a''$ again causes movement of the aperture and the surrounding integrally formed blade to the position indicated in broken lines as 50. Similarly, rotation of the point $a$ to the position indicated by $a'''$ causes movement of the aperture and integrally formed surrounding blade 36 to the position indicated in broken lines as 51. Accordingly, it can readily be seen that the rotational movement of cam element 40, by virtue of its off-set connection to the drive shaft 30 causes a movement of the cutting blade in a somewhat eccentric, planar path, but in a non-rotating orientation relative to its own longitudinal axis or the longitudinal axis of drive shaft 30. A unique cutting action is thereby provided on the grass or other substance being cut by this movement of the cutting blade 36.

Biasing means in the form of a plurality of spring elements 52, 54, 56 and 58 are provided wherein the spring elements are interconnected between blade 36 and the supporting frame 32. Each of the spring elements 52, 54, 56 and 58 are located in predetermined position relative to one another and their supporting mount 32 so as to exercise proper biasing force on cutting blade 36. More specifically, upon rotation of drive shaft 30 and cam element 40, the biasing forces exerted on the blade tend to cause a "oscillating" motion due to the eccentric motion forced on the blade by its eccentric path of travel. Arrows 57 and 59 represent the general path of travel and cutting action exerted on the material being cut by the cutting blade 36.

Referring to FIGS. 2 and 3, the various connecting elements 60, 61, and 62 in the form of nuts, bolts and washer elements serve to interconnect the cutting blade to the drive shaft through its sliding engagement with cam element 40.

Again with reference to FIG. 1, prime mover 18 is also drivingly interconnected through applicable gearing assemblies to the debris collection assembly generally indicated as 64. The gearing assemblies comprise a drive chain 66 and interconnecting gears 68 and 70 connected to the rotating shaft 20 of prime mover 18 and the drive shaft 72 of an impeller means 74.

A collection housing 76 is mounted on housing 12 and is configured to encase or house therein a debris collection container 78 in the form of a plastic or like disposable material bag. A cover member 79 is detachably mounted on the housing 76 and serves to interconnect fluid conduit means 80 and 81 in fluid communication with the interior of the housing 76 and the container bag 78.

More specifically, conduit 80 interconnects the cutting area generally indicated as 82 and at least partially defined by the operative area of the cutting blade 36, with the collection housing 76. Similarly, conduit 81 interconnects the interior of the collection housing 76 with the impeller 74. The impeller 74 serves as a source of fluid flow or negative fluid pressure. Upon activation of the prime mover 18, the rotational movement of the impeller 74 causes a negative fluid pressure and the fluid flow path to be defined from the cutting area, through the housing 76 into communication with the container 78 and back through to the impeller 74 as indicated by direction arrows 88.

Proper filtering means generally indicated in broken lines in FIG. 1 as 92 may be mounted in cover element 79 so as to force the debris collected from the cutting area 82 to be maintained within the housing 76 and specifically within the collection bag 78 mounted therein. By virtue of the driving interconnection of both the impeller means 74 and the drive shaft 30 with a common prime mover means 18, the debris being cut by activation or operation of the cutting blade 36 will be simultaneously collected and lifted to travel along the path of fluid flow defined by the arrows 88 as described above.

It will thus be seen that the objects made apparent from the preceding description are efficiently attained, and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features herein described, and all statements of the scope of the invention which, as a matter of language, might be said to fall therebetween.

Now that the invention has been described, what is claimed is:

1. A cutting machine for grass or like substance, said cutting machine comprising: a housing movably supported relative to a surface being cut, a cutting assembly mounted on said housing and including prime mover means; said cutting assembly further comprising cutting blade means connected in driven relation to said prime mover means, said cutting blade means movably attached to said housing independent of said prime mover means so as to move relative to said housing in a non-rotational manner upon activation of said prime mover means, and bias means including a spring element interconnected between said housing and said cutting blade means and disposed to normally bias said cutting blade means into original, non-operative position during activation of said prime mover means.

2. A cutting machine as in claim 1 wherein said bias means comprises a plurality of spring elements attached to said cutting blade means in predetermined, spaced relation to one another, said plurality of spring elements disposed and configured to restrict movement of said blade to within a substantially predetermined path.

3. A cutting machine as in claim 1 wherein said cutting assembly comprises a drive shaft disposed in driven, interconnected relation to said prime mover means and in driving connection to said cutting blade means, said drive shaft movably mounted on said housing to rotate about its own longitudinal axis upon actuation of said prime mover means.

4. A cutting machine as in claim 3 wherein said cutting assembly comprises interconnection means disposed in movable interconnection between said blade means and said drive shaft, said blade means driven in movable relation to said drive shaft upon actuation of said prime mover.

5. A cutting machine as in claim 4 wherein said interconnection means comprises cam means connected to said drive shaft and drivingly engaging said blade means, said cam means disposed relative to both said drive shaft and said blade means to cause movement of said blade means in a predetermined orientation upon acutation of said prime mover means.

6. A cutting machine as in claim 4 wherein said interconnection means comprises cam means connected to said drive shaft, aperture means formed in said blade means, said cam means disposed to be movably mounted within and slidingly engaging the peripheral portions of said aperture.

7. A cutting machine as in claim 6 wherein said aperture is formed in the substantial center of said cutting blade means and said cam means is connected in substantially off-center relation to the longitudinal axis of said drive shaft, said relative disposition of said aperture and said cam means defining an eccentric movement of said blade means relative to said drive shaft.

8. A cutting machine as in claim 7 wherein said cam means comprises a substantially triangular external configuration and said aperture comprises a configuration incongruous to that of said cam means, each relatively disposed along their respective external and internal configurations so as to be arranged in sliding engagement with one another.

9. A cutting machine as in claim 1 further comprising a source of fluid flow mounted on said housing in fluid communication with a cutting area substantially defined by the operative position of said cutting blade means, debris collection means disposed in fluid communication relative to said cutting area whereby debris is entrained in fluid passing from said cutting area to said debris collection means.

10. A cutting machine as in claim 9 wherein said source of fluid flow comprises impeller means interconnected in driven relation to said prime mover, said blade means and said impeller capable of concurrent operation upon activation of said prime mover, whereby debris may be removed from the cutting area upon being cut.

11. A cutting machine as in claim 9 wherein said debris collection means comprises a disposable collection container movably mounted on said housing.

12. A cutting machine for grass or like substance, said cutting machine comprising: a housing movably supported relative to a surface being cut, a cutting assembly mounted on said housing and including prime mover means; said cutting assembly further comprising cutting blade means connected in driven relation to said prime mover means, said cutting blade means movably attached to said housing independent of said prime mover means so as to move relative to said housing in a non-rotational manner upon activation of said prime mover means said cutting connection means disposed in movably interconnection between said blade means and said drive shaft, said blade means being driven in movable relation to said drive shaft upon actuation of said prime mover, said interconnection means comprising cam means connected to said drive shaft, aperture means formed in said blade means and said cam means being disposed to be movably mounted within and slidingly engaging the peripheral portions of said aperture.

13. A cutting machine for grass or like substance, said cutting machine comprising: a housing movably supported relative to a surface being cut, a cutting assembly mounted on said housing and including prime mover means; said cutting assembly further comprising cutting blade means connected in driven relation to said prime mover means, a source of fluid flow mounted on said housing in fluid communication with a cutting area substantially defined by the operative position of said cutting blade means for lifting the grass or like substance into a substantially upright position, said cutting blade means movably attached to said housing so as to move relative to said housing in a vibrator manner upon activation of said prime mover means to cut the upwardly extending grass or like substance.

* * * * *

UNITED STATES PATENT OFFICE
CERTIFICATE OF CORRECTION

Patent No. 4,043,100  Dated August 23, 1977

Inventor(s) Richard F. Aumann et al.

It is certified that error appears in the above-identified patent and that said Letters Patent are hereby corrected as shown below:

Column 2, line 19, insert "the" after --with--.

Signed and Sealed this

Third Day of January 1978

[SEAL]

Attest:

RUTH C. MASON  
Attesting Officer

LUTRELLE F. PARKER  
Acting Commissioner of Patents and Trademarks